Nov. 17, 1931.  H. M. MEYER ET AL  1,832,645
CROSSING GATE
Filed April 29, 1929    4 Sheets-Sheet 1
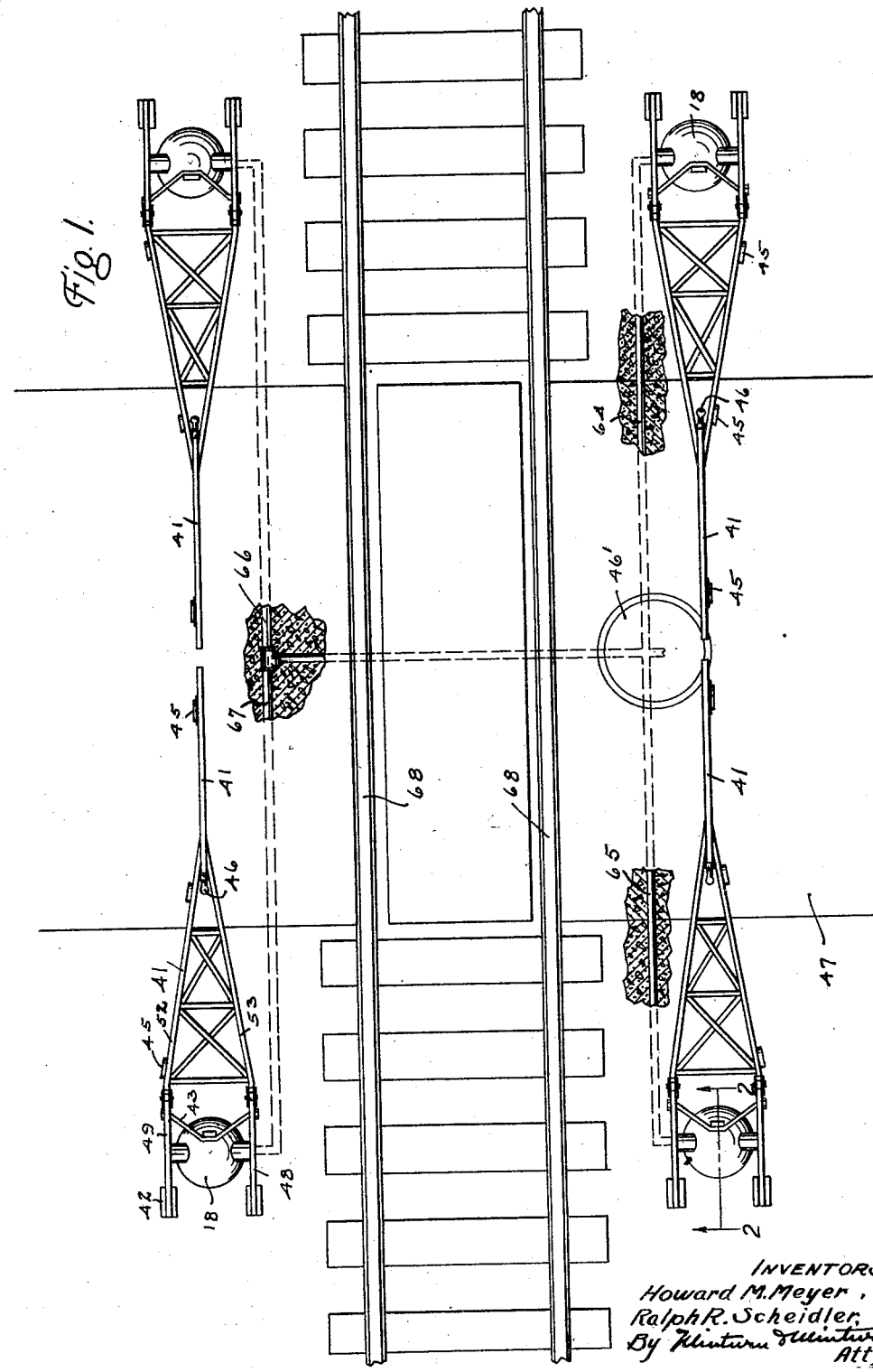
INVENTORS
Howard M. Meyer, and
Ralph R. Scheidler,
By Minturn & Minturn,
Attys.

Nov. 17, 1931.  H. M. MEYER ET AL  1,832,645
CROSSING GATE
Filed April 29, 1929   4 Sheets-Sheet 2
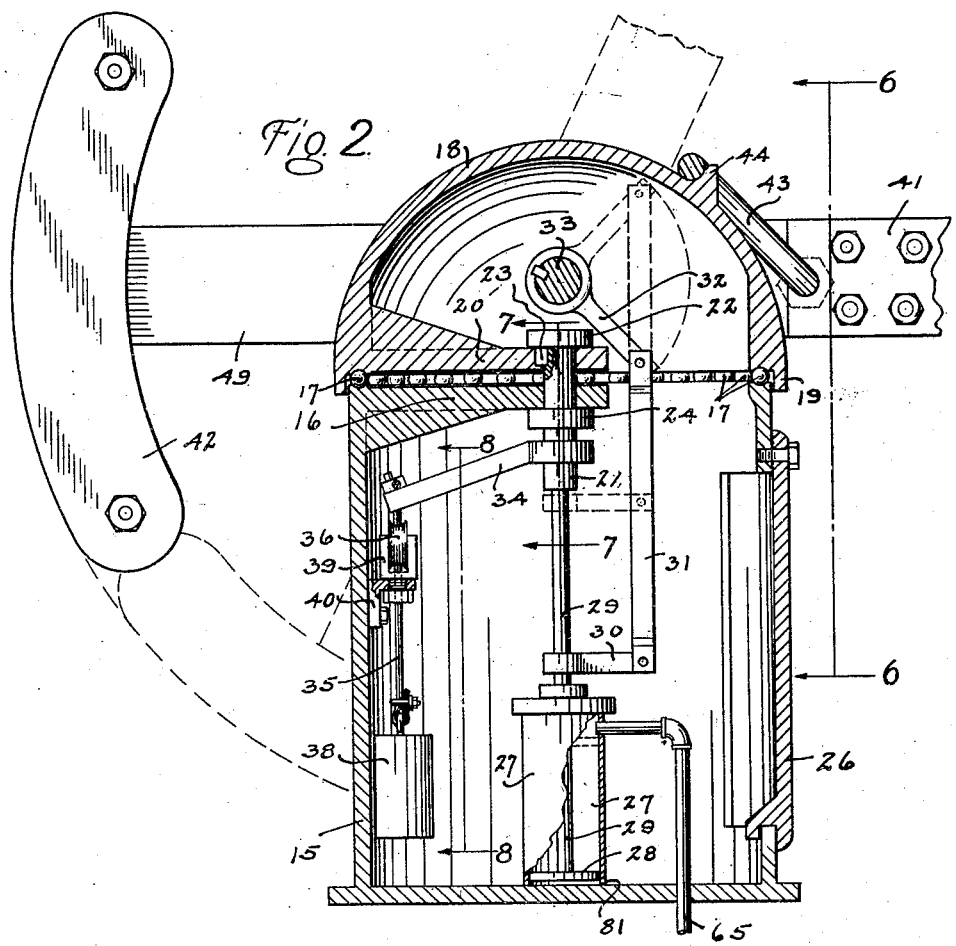
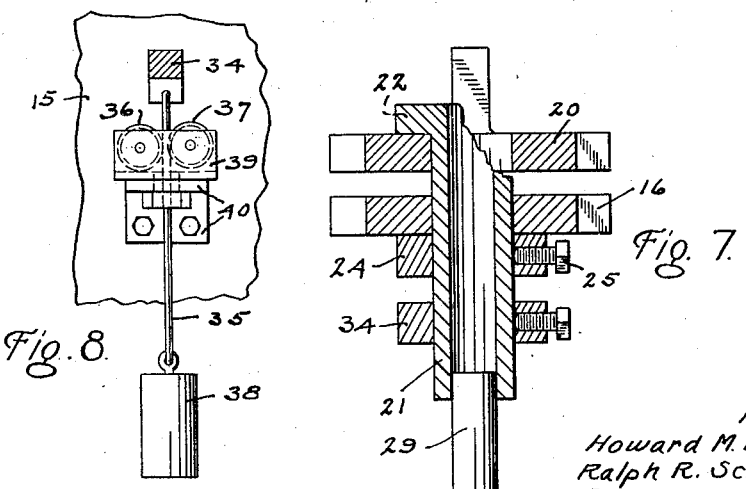
INVENTORS,
Howard M. Meyer, and
Ralph R. Scheidler,
By, Minturn & Minturn,
Attorneys Nov. 17, 1931.    H. M. MEYER ET AL    1,832,645
CROSSING GATE
Filed April 29, 1929    4 Sheets-Sheet 3
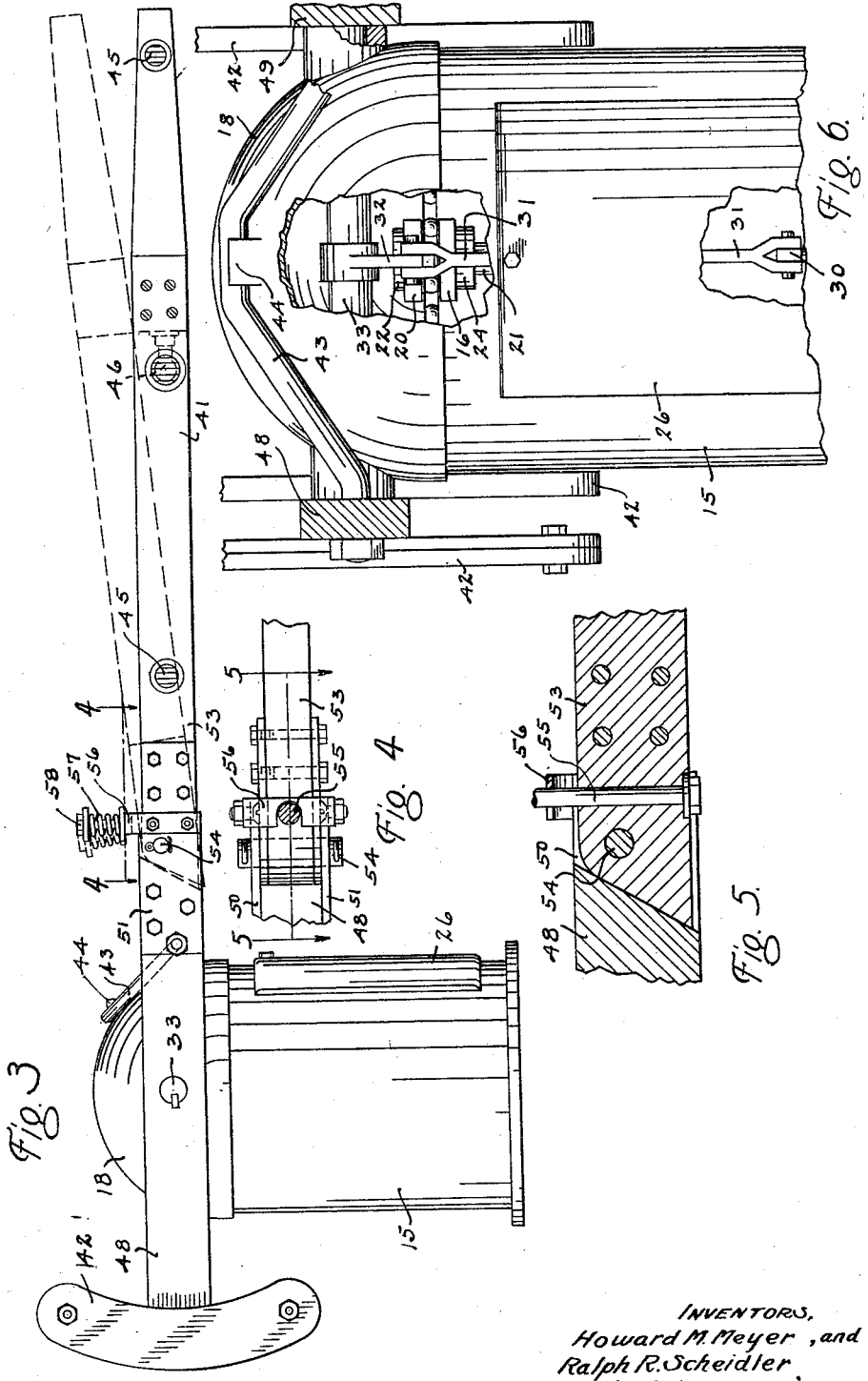
INVENTORS.
Howard M. Meyer, and
Ralph R. Scheidler.
BY Minturn Minturn
Attorneys.

Nov. 17, 1931.  H. M. MEYER ET AL  1,832,645
CROSSING GATE
Filed April 29, 1929   4 Sheets-Sheet 4
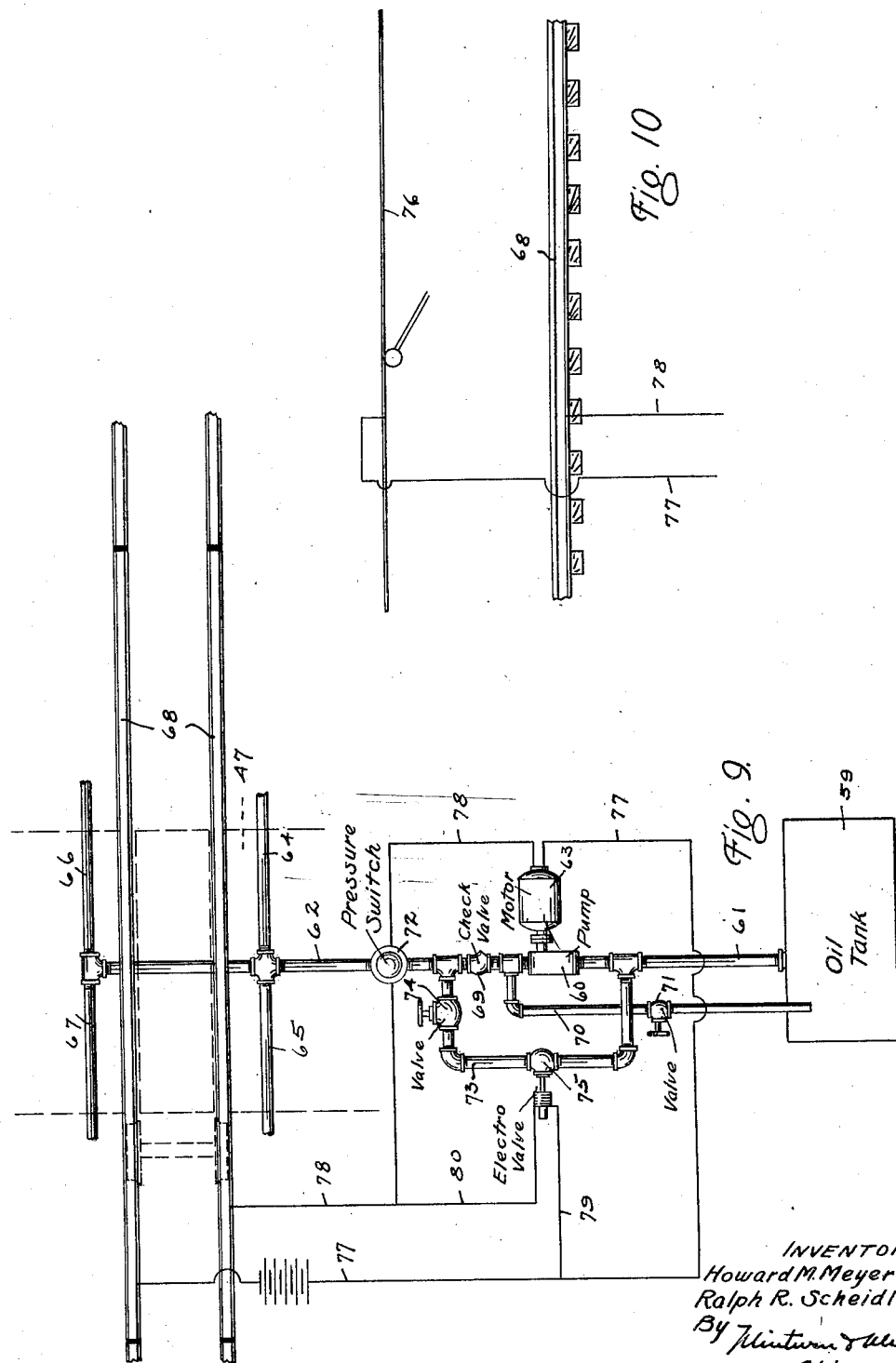

Patented Nov. 17, 1931

1,832,645

UNITED STATES PATENT OFFICE

HOWARD M. MEYER AND RALPH R. SCHEIDLER, OF INDIANAPOLIS, INDIANA, ASSIGNORS, BY MESNE ASSIGNMENTS, TO AUTOMATIC SAFETY SIGNAL GATE COMPANY, OF COLUMBUS, INDIANA, A CORPORATION OF NEVADA

CROSSING GATE

Application filed April 29, 1929. Serial No. 358,859.

This invention relates to gates employed as barriers at railway crossings of highways and the like, and has for its primary objects the provision of a gate lowering and raising mechanism automatically operated upon a predetermined travel of a train or car along the railway in reference to the highway crossing; the provision of means for permitting the gate to be moved out of the way should a vehicle be suddenly confronted by the lowering of the gate and for returning the gate automatically to its barrier position across the highway upon travel of the vehicle therepast; the provision of a gate yielding in its vertical plane of travel for prevention of damage should the gate be lowered onto a passing vehicle; and the provision of means forcing the gate to a lowered position and permitting the gate to return to a raised position by action of gravity whereby no electrical energy will be exerted in relation to the gate operating mechanism at any time during the stationary raised position of the gate.

Other important objects reside in the provision of a simple gate operating mechanism that will be extremely durable throughout long periods of usage and under varying weather conditions; and the provision of a structure that has few moving parts and that are readily accessible for inspection, adjustment and replacement when necessary.

These and other objects will become apparent in the following description of one form of the invention as shown by the accompanying drawings, in which—

Fig. 1 is a top plan view of a highway and railway crossing with our invention applied thereto;

Fig. 2, a vertical section on the line 2—2 in Fig. 1, on an enlarged scale;

Fig. 3, a side elevation of a gate also on an enlarged scale;

Fig. 4, a transverse section on the line 4—4 in Fig. 2;

Fig. 5, a vertical section on the line 5—5 in Fig. 4;

Fig. 6, a vertical section on the line 6—6 in Fig. 2;

Fig. 7, a vertical section on the line 7—7 in Fig. 2;

Fig. 8, a vertical section on the line 8—8 in Fig. 2;

Fig. 9, a combined wiring and piping, diagram; and

Fig. 10, a detail in diagram of a form of power intake modified from that shown in Fig. 9.

Like characters of reference indicate like parts throughout the several views in the drawings.

We form a hollow cylindrical standard 15 having an arm 16 projecting horizontally from its top edge toward the center of the standard to have a hole bored vertically therethrough axially of the standard, otherwise the standard 15 is entirely open across its top side. Around the top edge of the standard 15 is cut an annular groove which carries a plurality of ball bearings 17 free to roll therearound.

A hemi-spherical dome 18 has an annular groove cut around its lower edge of the same diameter as that of the standard and is positioned over the standard 15 to rest on the ball bearings 17 by the grooved channel so that the dome 18 is free to revolve axially of the standard 15 on the bearings 17. An annular lip 19 hangs down from the dome 18 to extend past the space between the edges of the dome and standard to prevent rain and dirt entering therebetween.

An arm 20 projects horizontally from the lower edge of the dome 18 toward the center thereof and has a hole bored vertically therethrough axially of the standard 15, and a sleeve 21 having a collar 22 on its upper end is passed through the hole in the arm 20 and down through the hole in the arm 16 to have the collar 22 rest on the top arm 20.

The sleeve 21 is fixed to the arm 20 by the key 23 but rotatively passes through the arm 16 to have a collar 24 carried on the sleeve 21 pressed up against the under side of the lower arm 16 and there secured by the set screw 25 as a means of preventing the lifting of the dome 18 from off the standard 15. A door 26 is provided in the side of the standard 15 to permit access to within.

On the floor of the standard 15, we secure a cylinder 27 in a vertical position axially of the standard 15. A piston 28 is carried within the cylinder and has a piston rod 29 affixed thereto and extended to without the cylinder to slidably enter and be guided within the sleeve 21 thereabove. An arm 30 is fixed to the rod 29 to project horizontally therefrom, and to its outer end is pivotally connected therewith, a link 31 which extends upwardly therefrom to have its upper end pivotally secured to the outer end of the lever 32.

The lever 32 is fixed on the transverse shaft 33 which is rotatably carried in bearings on opposite sides of the dome 18. A lever 34, Figs. 2 and 7, is fixed on the sleeve 21 below the collar 24 and normally extends toward the side of the standard 15 under the arm 16. A cable 35 is fixed to its outer end and passes downwardly between the pulleys 36 and 37, Figs. 2 and 8 to carry a weight 38 therebelow. The pulleys 36 and 37 are rotatably carried in the carrier 39 which is rotatable about a vertical axis, the carrier 39 having a hollow shank through which the cable 35 passes rotatably carried in the bracket 40.

The shaft 33 projects by each end from the dome 18 to carry thereon in a fixed position the gate 41 by the parallel arms 48 and 49 which carry the counterweights 42 beyond the shaft.

The counterweights are of sufficient weight to overcome the weight of the gate and normally rock it to an upper open position as indicated by the dash lines in Fig. 2.

A yoke 43 joins the two sides of the gate and is formed to contact and bear against the lug 44 on the dome to limit the downward swing of the gate to a horizontal position. Reflecting glasses 45 are provided along the gate and a light 46 is mounted thereon in a protected position as warning signals. The arms 48 and 49 have their forward ends cut off diagonally downward and backward toward the standard 15 Figs. 3, 4, and 5, and have the side plates 50 and 51 fixed to and extending along from the sides of the arms 48 and 49 to receive therebetween the rear ends of the gate arms 52 and 53 on the pivot pin 54, the ends of the gate arms 52 and 53 being cut diagonally to abut against the ends of the arms 48 and 49 so that the gate 41 may be swung upwardly about the pin 54, but may not drop below a straight line position of the gate 41 and the arms 48 and 49.

A bolt 55 extends from the top side of the gate arms 52 and 53 and passes up through a yoke 56 carried on the arms 48 and 49 and compressively holds a spring 57 against the top side of the yoke 56 by the nut 58, the spring 57 serving as a cushion in retarding the sudden stopping of the gate 41 when coming to a straight line position with the arms 48 and 49.

At some convenient place, here shown in Fig. 1 as in a well 46' in the highway 47, an oil supply tank 59 is located, and a pump 60 is mounted in close proximity thereto to have an intake line 61 and a discharge line 62. The pump is driven by the electric motor 63. The line 62, by suitable branches 64, 65, 66, and 67 leads to each of the standards 15 carrying the gates 41, here shown Fig. 1, as four in number, two on each side of the railway track 68, and discharges thereby into the top end of the cylinder 27.

In the discharge line 62 is a check valve 69, and from between the check valve 69 and the pump 60 leads a bi-pass line 70 back to the tank 59 with a regulating valve 71 therein. Beyond the check valve 69, a pressure controlled electric switch 72 is interconnected with the line 62 to communicate line pressures thereto. Between the switch 72 and the check valve 69, a pump bi-pass line 73 is connected into the line 62 to lead around the pump 60 and back into the intake line 61. In the bi-pass line 73 is a manually operated shut-off valve 74 and an electrically operated shut-off valve 75 of the electro-magnetic type.

The track 68 is suitably divided into blocks in the usual manner so that a car or train approaching the highway 47 may operate an electric circuit to cut in a supply of electricity to operate the motor 63. It is to be remembered that the gate normally remains open or in an upright position leaning toward the highway slightly from a vertical position. In that position, the shaft 33 is rocked to cause the lever 32 by the link 31 to pull the piston 28 to the upper end of the cylinder 28.

Now when the train enters the block on the track 68 to close a circuit, here shown as through a battery in Fig. 9, and from the trolley wire 76 and track 68 of an electric line, Fig. 10, current will flow through the wires 77 and 78 Fig. 9, to set the motor 63 in operation. At the same time, current will flow through the wires 79 and 80 to operate the valve 75 so as to close the bi-pass line 73. The pressure switch 72 is closed when the gate is up. The motor drives the pump 60 to withdraw oil from the tank 59 up through the intake pipe 61 and discharge oil into the line 62 through the check valve 69 and past the pressure switch 72 on into the cylinder 27 to drive the piston 28 therein downwardly and hence pull the gates 41 down to overcome the counterweights. An air vent 81 is provided at the lower end of each cylinder 27.

When the gates 41 reach the horizontal positions as determined by the yokes 43, further movement of the pistons 28 is prevented with the result that the pump 60 still delivering oil, will cause a pressure to be built up in the cylinder 27 and line 62 above that normally required to lower the gates, and at a predetermined increase in pressure in the line 62 above the normal operating pressure, the switch 72 will be opened by reason of that pressure increase so that the motor 63 will be stopped. However, as long as the train is within the block, current is still being supplied to the magnet of the valve 75 to hold the valve closed. Therefore, by reason of the closed valve 75 and the check valve 69, no oil can flow back from the line 62 and the pressure is maintained therein. Should the pressure drop due to leaks, the switch 72 would automatically be closed and the motor set in operation to restore the pressure and again be opened to stop the motor.

The bi-pass line 70 is provided as a means for bleeding back part of the oil from the line 62 where the motor may turn so rapidly as to shoot the oil through the line 62 to cause too rapid a descent of the gates 41. The valve 71 is accordingly manipulated to secure the desired speed of lowering the gates. Now as soon as the block is clear, and no current is supplied the wires 77 and 78, the valve 75 is released from the magnetic pull and returns to an open position so that oil may then drain back from the line 62 into the tank 59 reducing the pressure to permit the switch 72 to close and be ready for the next operation and to permit the counterweights 42 to pull the gates 41 back to the open positions.

While it is customary to employ some audible warning signal in conjunction with the operation of the gates 41, it may happen that the gates 41 start to lower as a vehicle approaches the crossing on the highway and that the vehicle continues on over the crossing. If a gate strikes the vehicle while being lowered, its hinged construction permits the mechanism within the standard 15 to continue functioning without damage and as soon as the vehicle moves on out from under, the gate proper may drop on down to the horizontal position. Also, since the dome 18 is revolvable on the standard 15, the vehicle may carry the gate 41 on around horizontally preventing damage to both the gate and vehicle, and the weight 38 will return the gate to the normal position across and at right angles to the highway, and there hold it, any horizontal swinging of the gate causing the weight 38 to be lifted by reason of the pull of the lever 34 drawing the cable 35 up over either pulley 36 or 37 depending on the direction the gate is swung.

While we have here described and shown our invention in the best form now known to us, it is obvious that structural changes may be made from that form without departing from the spirit of the invention, and we, therefore, do not desire to be limited to that form, nor any more than may be required by the following claims.

We claim:

1. In a crossing gate, a standard, a head carried by and revolvable in a fixed, horizontal plane on the standard, a transverse shaft rockably supported by the head, a gate fixed on the shaft, a cylinder supported in fixed relation to and by the standard, a piston in the cylinder, a piston rod extending from the piston and to without the cylinder, means interconnecting the piston rod with said shaft to cause rocking of the shaft upon travel of the piston rod, said gate being balanced on said shaft whereby the gate will normally swing from a horizontal to an upright position and move said piston along in said cylinder, and means for moving said piston in the opposite direction to rock said shaft to pull said gate downwardly substantially to a horizontal position.

2. In a crossing gate, a standard, a head on the standard horizontally rotatable thereon, a shaft rockably carried by the head, a gate fixed on the shaft, a cylinder fixed in relation to the standard, a piston in the cylinder, a piston rod connected to the piston, a lever fixed to said shaft, and a link between said lever and said piston rod, said link being associated with said rod to permit the link to be raised and lowered by corresponding travel of the rod and to permit the link to revolve with said head.

3. In a crossing gate, a standard, a head on the standard horizontally rotatable thereon, a shaft rockably carried by the head, a gate fixed on the shaft, a cylinder fixed to the standard, a piston in the cylinder, a piston rod connected to the piston and extending from the cylinder, a lever fixed to said shaft, and means including a link pivotally interconnecting said lever and said piston rod, said cylinder being mounted vertically and axially of said head, said piston being near the bottom of the cylinder when said gate is in a horizontally disposed position, and said gate being disposed about said shaft to have its center of gravity back of said shaft to cause the gate to swing normally toward an upright position and carry said piston toward the top of said cylinder.

4. In a crossing gate, a standard, a head revolvably supported thereon at its top end, an arm extending from the head, an arm extending from the standard, a sleeve fixed to and extending axially of the head arm downwardly and revolvably through said standard arm, a transverse shaft rockably carried by said head, a gate carried by said shaft adapted to swing in a vertical plane, a lever fixed to said sleeve, a weight suspended from the lever, and guide means carried by the standard maintaining said weight in a fixed vertical line of travel during horizontal rotation of said lever, and means for rocking said shaft.

5. In a crossing gate, a standard, a head horizontally revolvably supported thereon at its top end an arm extending from the head, an arm extending from the standard, a sleeve fixed to the head arm and extending downwardly revolvably through the standard arm axially of the head, a transverse shaft rockably supported by the head, a cylinder carried in a fixed vertical relation to the standard and axially of said sleeve, a piston in the cylinder, a piston rod extending from the piston to without the cylinder and entering slidably into said sleeve, a lever fixed to said transverse shaft, and means including a link interconnecting said lever and said piston rod.

6. In a crossing gate, a standard, a head horizontally revolvably supported thereon at its top end, an arm extending from the head, an arm extending from the standard, a sleeve fixed to the head arm and extending downwardly revolvably through the standard arm axially of the head, a transverse shaft rockably supported by the head, a cylinder carried in a fixed vertical relation to the standard and axially of said sleeve, a piston in the cylinder, a piston rod extending from the piston to without the cylinder and entering slidably into said sleeve, a lever fixed to said transverse shaft, an arm fixed to said piston rod between said sleeve and said cylinder, and a link interconnecting said lever and said piston rod arm.

7. In a crossing gate, a standard, a head horizontally revolvably supported thereon at its top end, an arm extending from the head, an arm extending from the standard, a sleeve fixed to the head arm and extending downwardly revolvably through the standard arm axially of the head, a transverse shaft rockably supported by the head, a cylinder carried in a fixed vertical relation to the standard and axially of said sleeve, a piston in the cylinder, a piston rod extending from the piston to without the cylinder and entering slidably into said sleeve, a lever fixed to said transverse shaft, and means including a link interconnecting said lever and said piston rod, a lever fixed to said sleeve below said standard arm, a cable fixed to the outer end of the lever, a weight carried by the cable, a guide on each side of the cable carried by the standard permitting the cable to be drawn thereover as said last lever may be swung horizontally by said head.

8. In a crossing gate, a standard, a head horizontally revolvably supported thereon at its top end, an arm extending from the head, an arm extending from the standard, a sleeve fixed to the head arm and extending downwardly revolvably through the standard arm axially of the head, a transverse shaft rockably supported by the head, a cylinder carried in a fixed vertical relation to the standard and axially of said sleeve, a piston in the cylinder, a piston rod extending from the piston to without the cylinder and entering slidably into said sleeve, a lever fixed to said transverse shaft, and means including a link interconnecting said lever and said piston rod, a gate carried by said shaft, a lug on the head, and a stop carried by the gate adapted to contact said lug and prevent further downward travel of said piston in said cylinder.

9. In a crossing gate, a standard, a head on the standard horizontally rotatable thereon, a shaft rockably carried by the head, a gate lowering shaft, a cylinder fixed in relation to the standard, a piston in the cylinder, a piston rod connected to the piston, a lever fixed to said shaft, and a link between said lever and said rod elevated and lowered by corresponding travel of the rod, said link being carried around by rotation of said head, and yielding means normally maintaining said link in a predetermined position in reference to horizontal travel about the axis of said cylinder.

10. In a crossing gate, a standard, a head horizontally revolvable on the standard, a gate vertically revolvable on the head, a gate operating cylinder fixed relative to the standard, a piston vertically reciprocative in the cylinder and connecting means between the piston and the gate whereby reciprocation of the piston in the cylinder will raise and lower the gate at any horizontal degree of rotation of the head.

11. In a crossing gate, a standard, a head horizontally revolvable on the standard, a gate vertically revolvable on the head, gate raising and lowering means fixed relative to the standard, and connecting means between said gate and said gate raising and lowering means whereby said gate may be lowered and raised by said means at any horizontal degree of rotation of said head.

In testimony whereof we affix our signatures.

HOWARD M. MEYER.
RALPH R. SCHEIDLER.